United States Patent [19]

Trares et al.

[11] 4,361,298
[45] Nov. 30, 1982

[54] PNEUMATIC DEICER

[75] Inventors: Bernard F. Trares, Cuyahoga Falls; Robinson F. Nichols, Stow, both of Ohio

[73] Assignee: The B.F. Goodrich Company, Akron, Ohio

[21] Appl. No.: 182,531

[22] Filed: Aug. 29, 1980

Related U.S. Application Data

[63] Continuation-in-part of Ser. No. 884,923, Mar. 9, 1978, abandoned.

[51] Int. Cl.³ .................................................. B64D 15/16
[52] U.S. Cl. ................................................... 244/134 A
[58] Field of Search .......... 244/134 R, 134 A, 134 E; 156/286, 338, 123; 264/102, DIG. 78

[56] References Cited

U.S. PATENT DOCUMENTS

| 2,436,889 | 3/1948 | Heston | 244/134 A |
| 2,957,662 | 10/1960 | Hess | 244/134 R |
| 3,370,814 | 2/1968 | Kageorge et al. | 244/134 A |
| 3,604,666 | 9/1971 | Achberger | 244/134 A |

OTHER PUBLICATIONS

Morton, "Rubber Technology", pp. 27–28, Van Nostrand Reinhold Co., Aug. 14, 1974

Primary Examiner—Charles E. Frankfort
Attorney, Agent, or Firm—Joe A. Powell

[57] ABSTRACT

A pneumatic deicer and a method for making such deicer having a plurality of inflatable tubes which are capable of being distended by inflation to break up the accumulation of ice. The tubes are constructed with a nonflowing elastomeric compound leaving a passageway therein after vulcanization of the deicer by external heat.

6 Claims, 3 Drawing Figures

PNEUMATIC DEICER

CROSS REFERENCE TO RELATED APPLICATION

This is a continuation-in-part of my co-pending application Ser. No. 884,923 filed Mar. 9, 1978 now abandoned.

BACKGROUND OF THE INVENTION

This invention relates to pneumatic deicers and more particularly to a pneumatic deicer and the method of making a pneumatic deicer of the type employing a boot of resilient material attached to the leading edge of an airfoil wherein the boot has a plurality of inflatable tubes which are selectively distended as by inflation pressure to break up ice accumulation which tends to form on the surface of the boot. The inflatable tubes are generally disposed in a direction parallel to each other in the spanwise direction of the leading edge of the airfoil. The tubes, however, may be disposed to extend in the direction of the airfoil or in any other angular position. The deicer is vulcanized by steam which also passes through the inflation tubes assuring that the tubular passageway remains open so that the inner peripheral surfaces of such passageway do not adhere to each other. The inflation of the tube is performed through a manifold that extends transversely of and overlies the tubes. In the manufacture of the boot assemblies, various modifications in tube construction have been tried to facilitate the inflating and evacuation process of the tubes since it is desirable to so construct the boot assembly to provide an unencumbered flow of air to and from the tubes. To insure such flow, additional materials, such as flocked liners or fabrics, have been integrated into the tube structure; however, such finally constructed boots would present ripples and objectionable thickness thereby rendering such boot objectionable for aesthetic reasons as well as for aerodynamic reasons.

The present invention provides a simple structure and method of constructing a deicer to provide for the adequate bleeding of the inflation tubes during the deflation cycle, eliminating the need for building in additional separating devices that add to the manufacturing cost and adversely affect aerodynamic conditions of the airfoils. The present invention substantially eliminates the causes of erosion of the skin of the deicers and materially improves the aerodynamics of the airfoils by keeping the airfoils smooth externally.

SUMMARY OF THE INVENTION

The pneumatic deicer and method of the present invention provides a boot which is smooth and of uniform thickness, wherein the inflating tubes are formed using fabric coated with an elastomer of a nonflowing compound on the one side thereby leaving the fabric with uncoated portion on the other side in cooperation with the nonflowing compound on the inside of the tube allowing the bleeding off of the inflation air directly to the manifold or via a channel and the manifold. The cross communication of the tubes with the manifold is maintained easily and in an economic manner.

DETAILED DESCRIPTION

Figure 1:
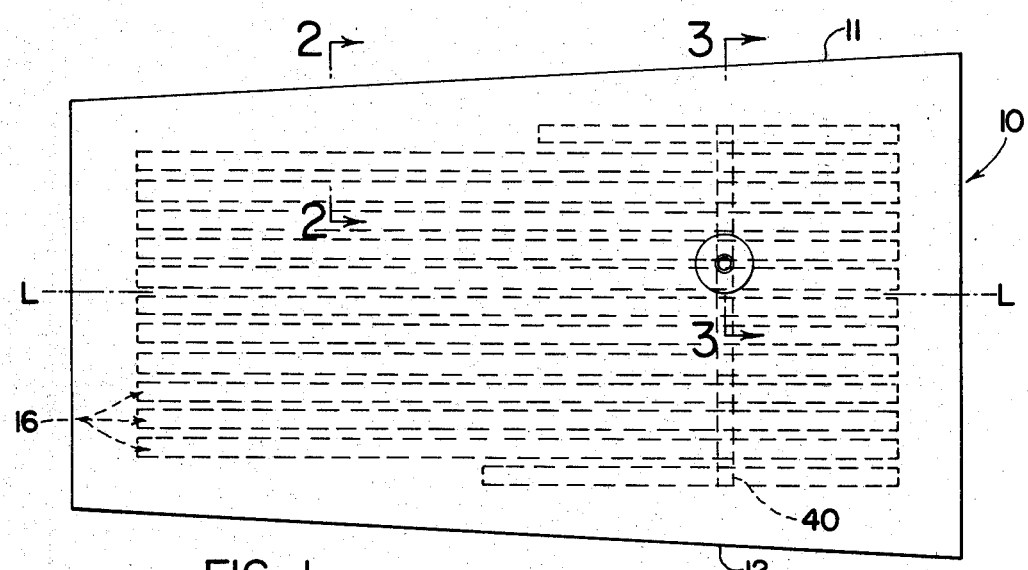
FIG. 1 is a plan view of the deicer boot with the inflation tubes being shown in dotted lines.

Referring to the drawings wherein like reference numerals designate like or corresponding parts throughout the several views, there is shown in FIG. 1 a laminated inflatable deicer boot 10 in the condition prior to installation on an airfoil with the leading edge of the airfoil to be covered by the leading edge portion of the boot indicated by the dot-dash line L—L. Trailing edges 11 and 12 of the boot extend toward the rear of the airfoil on the upper and under side thereof. The bottom ply 15 which may be fabric coated with rubber or other resilient rubberlike material extends over a series of longitudinal tubular members or inflation tubes 16 as shown in dotted lines in FIG. 1.

The inflation tubes 16 are made of a nylon or other similar fabric 17 which has a nonflowing, during curing, rubberized compound 18 containing cross-linked natural rubber greater than 1% by weight on one side and with the other side (inward side) being uncoated due to the nonflowing nature of such compound 18 to provide an inner tubular surface that has fabric and the nonflowing compound 18. The fabric 17 of the inflation tubes 16 is tricot knit fabric or woven fabric coated with the rubberized compound 18 in such a manner that the tubes 16 may expand during inflation but are not extensible in the longitudinal direction. A top ply 20 of resilient rubber or rubberlike materials is disposed on top of the inflation tubes 16. A sheet of resilient rubberlike material 21 such as Neoprene covers the top ply 20. Side fill gum 23 is positioned adjacent to the outermost tube 16 between top ply 20 and the bottom ply 15. Fill gum 23A is interposed between the respective tubes 16 and the bottom ply 15 and top ply 20. A variation of such invention contemplates the elimination of the fill gum 23A.

The rubber compound 18 is made nonflowing by mixing with a conventional rubber compound an amount greater than 1% by weight of cross-linked natural rubber. The cross-linked natural rubber found to be particularly desirable in this invention is one sold under the tradename PA 80. PA 80 is a blend of 80% cross-linked natural rubber and 20% unvulcanized natural rubber. In addition to containing greater than 1% by weight of cross-linked natural rubber, the compound 18 may also contain conventional rubbers, preferably natural rubber; fillers such as carbon black and/or silica fillers and the like; activators such as zinc oxide, stearic acid and the like; processing aids such as oils and resins; age resistors; rubber to fabric adhesion promotors such as HRH systems (hexamethylenetetramine-resorcinol-HiSil) or adhesion promotors sold under the tradename Cohedur RL and the like; vulcanizing agents such as sulfur, sulfur donors and accelerators also are present in the rubber compound 18.

An example of a nonflowing compound which would have acceptable performance in this invention is one having the following formulation:

| INGREDIENT | PARTS BY WEIGHT |
|---|---|
| Natural Rubber | 86 |
| PA-80 (80% cross-linked natural rubber) | 14 |

| INGREDIENT | PARTS BY WEIGHT |
| --- | --- |
| Carbon Black | 40 |
| Resins, oils, antioxidant | 7 |
| Silica Fillers | 18 |
| Zinc Oxide | 3 |
| Stearic Acid | 3 |
| Vulcanizing Agents | 3 |
| Adhesion Promotors | 6 |

The ingredients of the nonflowing compound may be varied as is well understood by those skilled in the art of rubber compounding. The essential feature that the compound must have is that it must be nonflowing. The nonflowing feature is achieved by using greater than 1% by weight of cross-linked natural rubber.

The nonflowing rubber compound is prepared by mixing the ingredients on standard rubber mixing equipment such as Banbury mixers, mills and the like. The mixing procedures used are conventional and well understood by those skilled in the art.

Figure 2:
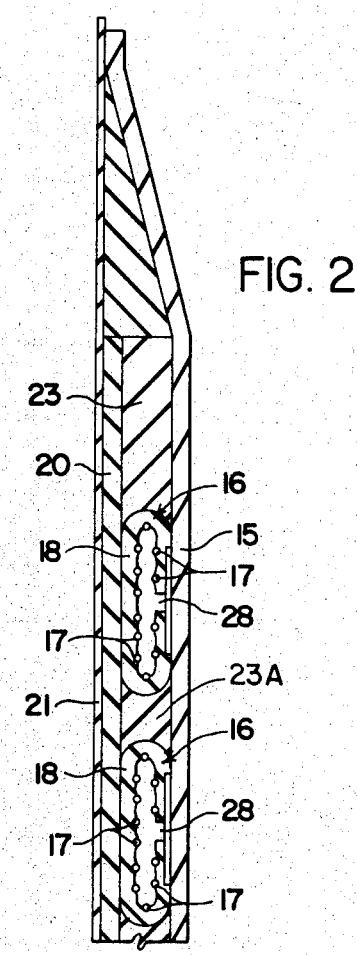
FIG. 2 is an enlarged section of the deicer boot taken along line 2—2 of FIG. 1 with a portion broken away.
Figure 3:
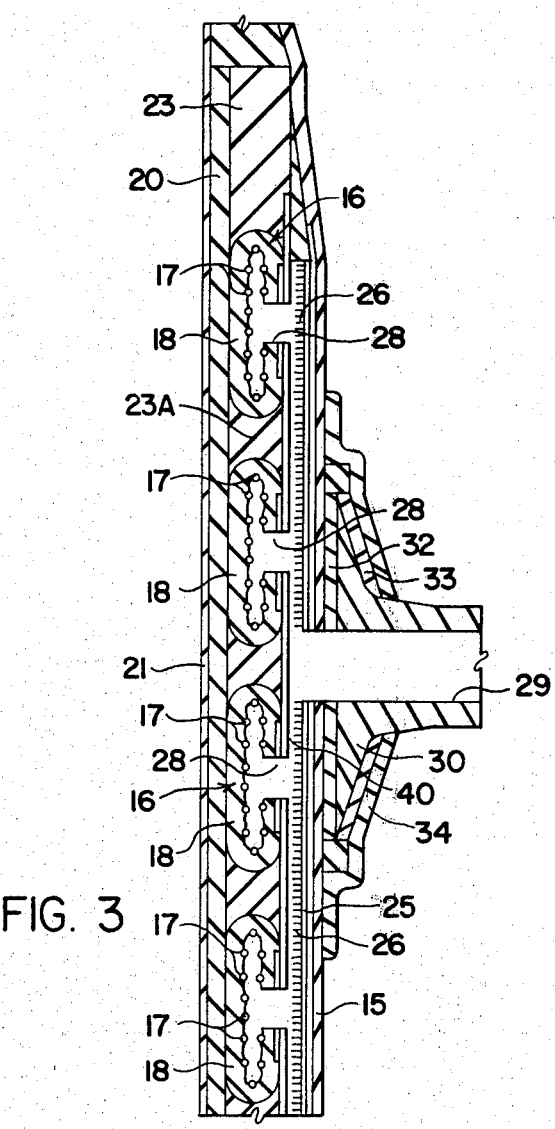
FIG. 3 is an enlarged section of the deicer boot taken along line 3—3 of FIG. 1 with a portion broken away.

As shown in FIG. 3, extending transversely across the inflation tubes 16 of the deicer boot 10 is a manifold ply 25 having a plurality of closely spaced elements such as stiff fibers 26 projecting outwardly and downwardly from the fabric to provide interstices and a passageway 40 through which the inflating medium can flow. The respective tubes 16 all have channels 28 (FIG. 2) on their back side of the boot 10 that run the full length of the tube and communicate with the space provided by the interstices of the fibers 26 of manifold ply 25 to provide for the inflation and deflation of the tubes 26. In lieu of such channels 28, a single port may be located directly in the tubes 16 at the juncture with manifold ply 25 to exhaust the pressurized air from the tubes 16 to the manifold. The interstices of the manifold ply 25 communicate with a central bore 29 on frustoconical annular supporting member or air connecting means 30 which is made of resilient rubber other rubberlike materials which may contain a hollow body of steel or other suitable material for the supply of inflating medium from the aircraft supply. Gum plies 32, 33, and reinforcing fabric material 34 encompass the supporting member 30 which supporting member 30 is cemented to the bottom ply 15. The above described plies of resilient rubberized materials are impervious to the inflating medium. Manifold ply 25 may have a central passageway therethrough that communicates with the respective ports or channels in the tubular members 16.

In the manufacture of the deicer boot 10 described above, the various plies, parts, and tubes are assembled and cemented together with tube 16 being compounded to include cross-linked natural rubber greater than 1% by weight, which cross-linked rubber prevents flow during cure. Ordinarily the deicer is cured by steam, having the steam enter the respective tubes during the actual cure to maintain the tubes 16 in a distended condition to prevent adhesion of the inner surfaces. In curing the deicer pad by this method, the steam can penetrate voids or pockets of material that were not properly sealed or cemented and adversely affect the quality of the end product. In the instant invention, the deicer pad in its assembled condition without the air connecting means 30 is covered by a bleeder material such as heavy-duty paper. The paper and deicer are then covered with a suitable cover ply that overlaps both to assure a positive seal around the edges. The cover ply has a small bore in it such that all air can be withdrawn from under the cover. In this instance a vacuum is drawn on the bore to evacuate the air from underneath the cover, with the paper acting as a wick to facilitate the removal of the air. The assembled deicer boot and cover are then subjected to vulcanization heat and vulcanized to provide a unitary structure with the nonflowing rubberized compound 18 assuring that the inner peripheral wall surface of the tubes 16 which have fabric therein retain their form and upon receiving pressurized air will inflate. Upon completion of vulcanization, the cover and paper are removed and a port or bore is cut into the deicer pad to communicate with the central passageway in the manifold 40. The air connecting means 30 is then cemented onto the deicer pad and vulcanized so that the central bore 29 thereof communicates directly with the cut port to the manifold 40.

A modification of the above process is to place a thin mesh nylon fabric onto the bottom ply 15 of the unvulcanized assembled deicer pad (containing the top ply 20, sheet material 21, tubes 16, manifold ply 25, and bottom ply 15) and then cover such pad with a bleeder pad such as a layer of porous paper. The deicer pad, nylon fabric, and paper are then covered completely with a suitable cover that overlaps all edges of the deicer pad and paper. In this condition, the parts as assembled are flat and void of air. However, to assure a complete absence of air, the cover is pierced to provide a port or bore and suitable means are connected to this pierced hole to withdraw all air from the deicer assembly, after which the pierced hole is immediately covered and sealed. The entire deicer assembly and cover are then vulcanized. Thereafter, the cover, paper, and nylon fabric are removed. The nylon fabric gives the bottom surface of the deicer pad a textured fabric finish thus acting as an impression cover or an impression fabric finish cover. The paper facilitates the removal of air and acts as a wick means for the removal of trapped air. The vulcanized deicer pad then has a hole cut into its bottom ply 15 on the manifold section 40 so as to communicate therewith. An air connecting means or valve 30 is then secured and vulcanized to the bottom ply 15 to have its bore 29 register with the hole cut in the ply 15. A further modification is to omit evacuation of the air from underneath the cover prior to vulcanization since careful assembling will substantially eliminate trapping of air; and since no steam is introduced into the tubes 16 themselves, the subsequent vulcanization process provides a more economical means for manufacturing quality deicers. The present invention also provides a flat, nonripple surface. When pressurized air is communicated to tubes 16 during deicing process, all tubes will be in full communication with the central passageway in the manifold ply 40 which in turn communicates with the central bore 29 of the air connecting means 30. Such deicer boot may be mounted on any airfoil of an aircraft in a manner old and well-known in the art.

It will be apparent that, although a specific embodiment and certain modifications of the invention have been described in detail, the invention is not limited to the specifically illustrated and described constructions since variations may be made without departing from the principles of the invention.

We claim:

1. An inflating deicer boot for mounting on an airfoil comprising a plurality of laterally spaced tubular members selectively inflated and deflated for breaking up the formation of ice on said airfoil; a manifold ply of rubberized materials extending transversely across said tubular members; said manifold ply having a passageway therethrough for the flow of air to pressurize or exhaust air from said tubular members; each of said tubular members having a port communicating with said passageway in said manifold ply; each of said tubular members being fabricated from tricot knit fabric; said tubular members being covered with a nonflowing rubberized compound containing greater than one percent by weight of cross-linked natural rubber prior to vulcanization that does not flow during vulcanization; a sealing layer of a vulcanizable material impervious to air overlaying said manifold ply and said tubular member, and at least another sealing layer of a vulcanizable material impervious to air underlaying said tubular members.

2. An inflatable deicer boot as set forth in claim 1 wherein each of said tubular members have a channel extending longitudinally therein communicating with said passageway in said manifold ply and with said ports.

3. An inflatable deicer boot for mounting on an airfoil comprising an inner ply for attachment to said airfoil; an extensible elastic air impervious outer ply overlying said inner ply; a plurality of laterally spaced tubular members interposed between said inner ply and said outer ply; a manifold ply extending transversely across said tubular member; said manifold ply having a plurality of fibers on one side whose interstices form a passageway that extends laterally across said tubular members; each of said tubular members having a port that communicates with said passageway for selective inflating and deflating of said tubular members to shatter ice films accumulating on the outside surface of said boot; each of said tubular members having an inner peripheral surface of fabric; each of said tubular members having an outer surface of nonflowing rubberized compound containing greater than one percent by weight of cross-linked natural rubber prior to vulcanization that is nonflowing during vulcanization; and all of said plies, and nonflowing rubberized compound being vulcanized to form a unitary integral deicer boot.

4. An inflatable deicer boot as set forth in claim 3 wherein said fabric for said tubular members is a woven fabric.

5. An inflatable deicer boot as set forth in claim 4 wherein each of said tubular members has a channel that extends along one side thereof communicating with said passageway in said manifold ply, and each of said ports in each of said tubular members merges with said channel in their respective said tubular members.

6. An inflatable deicer as set forth in claim 5 wherein fill gum is disposed between said laterally spaced tubular members.

* * * * *